(12) United States Patent
Sato

(10) Patent No.: US 9,939,716 B2
(45) Date of Patent: Apr. 10, 2018

(54) PROJECTOR AND METHOD OF CONTROLLING PROJECTOR

(71) Applicant: SEIKO EPSON CORPORATION, Tokyo (JP)

(72) Inventor: Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 144 days.

(21) Appl. No.: 14/030,410

(22) Filed: Sep. 18, 2013

(65) Prior Publication Data

US 2014/0085614 A1  Mar. 27, 2014

(30) Foreign Application Priority Data

Sep. 21, 2012  (JP) ................................ 2012-207897

(51) Int. Cl.
    *G03B 21/14*  (2006.01)
    *H05B 41/292*  (2006.01)
    *G03B 21/20*  (2006.01)

(52) U.S. Cl.
    CPC ....... *G03B 21/142* (2013.01); *G03B 21/2026* (2013.01); *H05B 41/2928* (2013.01)

(58) Field of Classification Search
    CPC .............. H05B 41/2887; H05B 41/382; H05B 41/2886; H05B 41/2882; H05B 41/388; H05B 41/2928; H05B 41/16; H01J 61/025; H01J 61/86; Y02B 20/208
    USPC ..... 315/212, 307, 224, 209 R, 46, 177, 276, 315/291
    See application file for complete search history.

(56) References Cited

U.S. PATENT DOCUMENTS

| | | | |
|---|---|---|---|
| 6,586,892 B2 | 7/2003 | Derra et al. | |
| 7,622,869 B2 | 11/2009 | Watanabe et al. | |
| 2007/0164687 A1* | 7/2007 | Watanabe | H04N 9/3114 315/291 |
| 2008/0048583 A1* | 2/2008 | Yamauchi | G03B 21/20 315/291 |
| 2009/0096385 A1 | 4/2009 | Yamauchi | |
| 2010/0141634 A1* | 6/2010 | Soma | H05B 41/2928 345/212 |
| 2010/0148686 A1* | 6/2010 | Arimoto | H05B 41/2883 315/246 |
| 2010/0244716 A1* | 9/2010 | Yamahara et al. | 315/224 |
| 2011/0234356 A1* | 9/2011 | Rohl | H01F 27/2847 336/192 |

(Continued)

FOREIGN PATENT DOCUMENTS

CN  101001339 A  7/2007
CN  101119607 A  2/2008

(Continued)

*Primary Examiner* — Alexander H Taningco
*Assistant Examiner* — Renan Luque
(74) *Attorney, Agent, or Firm* — Oliff PLC

(57) ABSTRACT

A projector includes a discharge lamp, a discharge lamp lighting device adapted to supply the discharge lamp with a drive current for driving the discharge lamp, a timer section adapted to count lighting time of the discharge lamp, and a control section adapted to control the discharge lamp lighting device to select and then perform either of a plurality of operation modes different in drive current to be output to the discharge lamp from each other, and the control section selects the operation mode based on the lighting time counted by the timer section.

10 Claims, 6 Drawing Sheets

(56) References Cited

U.S. PATENT DOCUMENTS

2011/0241565 A1    10/2011    Yamauchi

FOREIGN PATENT DOCUMENTS

| JP | 2003-131324 A | 5/2003 |
| JP | B2 3675426 | 7/2005 |
| JP | B2 3794415 | 7/2006 |
| JP | 2009-117338 A | 5/2009 |
| JP | B2 4744719 | 8/2011 |

* cited by examiner

PROJECTOR AND METHOD OF CONTROLLING PROJECTOR

BACKGROUND

1. Technical Field

The present invention relates to a projector and a method of controlling a projector.

2. Related Art

In the past, there has been known a device using a discharge lamp such as a high-pressure mercury lamp for a light source of a projector. Some projectors of this kind are capable of lighting the discharge lamp in a variety of conditions by changing the operation mode of determining the supply power to the discharge lamp, the current waveform, the frequency of the alternating current, and so on to thereby varying the current to be supplied to the discharge lamp (see, e.g., Japanese Patent No. 3,794,415. For example, the projector of Japanese Patent No. 3,794,415 varies the frequency and the current value of the rectangular current supplied to the lamp in order to suppress the flicker.

The projector of Japanese Patent No. 3,794,415 performs a high power mode of increasing the lamp current to raise the temperature of the electrodes to thereby attempt to inhibit the flicker from occurring. In the case of lighting the discharge lamp in such an operation mode, improvement in the performance as the light source such as increase in light intensity can be expected, while a disadvantage for the durability is caused since the electrode gap and the electrode shape are affected.

SUMMARY

An advantage of some aspects of the invention is to provide a projector and a method of controlling a projector each capable of achieving both of an improvement in performance as a light source and an improvement in durability by controlling lighting of a discharge lamp.

An aspect of the invention is directed to a projector including a discharge lamp, a discharge lamp drive section adapted to supply the discharge lamp with a drive current for driving the discharge lamp, a timer section adapted to count lighting time of the discharge lamp, and a control section adapted to control the discharge lamp drive section to select and then perform either of a plurality of operation modes different in drive current to be output to the discharge lamp from each other, and the control section selects the operation mode based on the lighting time counted by the timer section.

According to this aspect of the invention, since the plurality of operation modes for lighting the discharge lamp are controlled based on the lighting time of the discharge lamp, by appropriately adjusting, for example, the frequency and the time of performing the operation mode for increasing the light intensity of the discharge lamp, or appropriately combining this operation mode with an operation mode for restoring the electrode gap or the electrode shapes of the discharge lamp, it becomes possible to achieve both of the improvement of the performance as the light source and the improvement of the durability at the same time.

Another aspect of the invention is directed to the projector according to the above aspect of the invention, wherein the control section is capable of making the discharge lamp drive section perform the plurality of operation modes including a high-intensity mode and an electrode regeneration mode, and the high-intensity mode and the electrode regeneration mode are each an operation mode of outputting an alternating current to the discharge lamp, effective power in the high-intensity mode and effective power in the electrode regeneration mode are equal to each other, and a frequency of the drive current in the electrode regeneration mode is lower than a frequency of the drive current in the high-intensity mode.

According to this aspect of the invention, by performing two operations in the respective operation modes different in frequency of the drive current output to the discharge lamp in combination with each other based on the lighting time of the discharge lamp, it is possible to appropriately select the state of lighting the discharge lamp with the increased luminance and the state of restoring the electrode gap or the electrode shapes of the discharge lamp to thereby achieve both of the improvement of the performance as the light source and the improvement of the durability at the same time.

Still another aspect of the invention is directed to the projector according to the above aspect of the invention, wherein the timer section counts the lighting time of the discharge lamp for each of the operation modes performed by the discharge lamp drive section.

According to this aspect of the invention, since the lighting time of the discharge lamp is counted for each of the operation modes, it is possible to control the drive current to be output to the discharge lamp while reflecting the influence on the durability of the discharge lamp in more detail.

Yet another aspect of the invention is directed to the projector according to the above aspect of the invention, wherein the control section selects the operation mode to be performed by the discharge lamp drive section based on a parameter obtained using the lighting time in each of the operation modes counted by the timer section.

According to this aspect of the invention, since the drive mode is selected based on the lighting time of the discharge lamp counted for each of the operation modes, it is possible to select and then switch the operation mode while reflecting the influence on the durability of the discharge lamp in more detail, and it is possible to achieve both the improvement of the performance as the light source and the improvement of the durability at the same time using the detailed control.

Still yet another aspect of the invention is directed to the projector according to the above aspect of the invention, wherein the plurality of operation modes, which the control section makes the discharge lamp drive section perform, include operation modes different in effective power from each other.

According to this aspect of the invention, since the plurality of operation modes including the operation modes different in effective power from each other are selected and then performed, it is possible to perform the operation mode of increasing the light intensity while giving high priority to the performance as the light source, and by switching between the present operation mode and another operation mode, the durability can be assured.

Further another aspect of the invention is directed to the projector according to the above aspect of the invention, wherein the plurality of operation modes, which the control section makes the discharge lamp drive section perform, include an operation mode of varying the effective power as needed.

According to this aspect of the invention, since the plurality of operation modes including the operation mode of varying the effective power as needed are selected and then performed, the balance of the influence on the performance as the light source and the durability can be controlled in detail.

Still further another aspect of the invention is directed to the projector according to the above aspect of the invention, wherein the plurality of operation modes, which the control section makes the discharge lamp drive section perform, include an operation mode of varying instantaneous power while keeping the effective power of the drive current to be output to the discharge lamp.

According to this aspect of the invention, it is possible to increase the light intensity while suppressing the influence on the durability of the discharge lamp by performing the operation mode of varying the instantaneous power while keeping the effective power of the drive current to be output to the discharge lamp.

Yet further another aspect of the invention is directed to the projector according to the above aspect of the invention, wherein the plurality of operation modes, which the control section makes the discharge lamp drive section perform, include operation modes different in frequency of a rectangular wave to be output to the discharge lamp from each other.

According to this aspect of the invention, by varying the frequency of the rectangular wave of the drive current to be output to the discharge lamp, the balance of the influence on the performance as the light source and the durability can be controlled in detail.

Still yet further another aspect of the invention is directed to a method of controlling a projector equipped with a discharge lamp including: counting lighting time of the discharge lamp, selecting and then performing either of a plurality of operation modes different in drive current to be output to the discharge lamp from each other based on the lighting time of the discharge lamp counted, and supplying the discharge lamp with the drive current corresponding to the operation mode selected.

According to this aspect of the invention, since the plurality of operation modes for lighting the discharge lamp are controlled based on the lighting time of the discharge lamp, by appropriately adjusting, for example, the frequency and the time of performing the operation mode for increasing the light intensity of the discharge lamp, or appropriately combining this operation mode with an operation mode for restoring the electrode gap or the electrode shapes of the discharge lamp, it becomes possible to achieve both of the improvement of the performance as the light source and the improvement of the durability at the same time.

According to the aspects of the invention, since the plurality of operation modes for lighting the discharge lamp are controlled based on the lighting time of the discharge lamp, it become possible to appropriately control the operation state of the operation mode to thereby achieve both of the improvement of the performance as the light source and the improvement of the durability at the same time.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
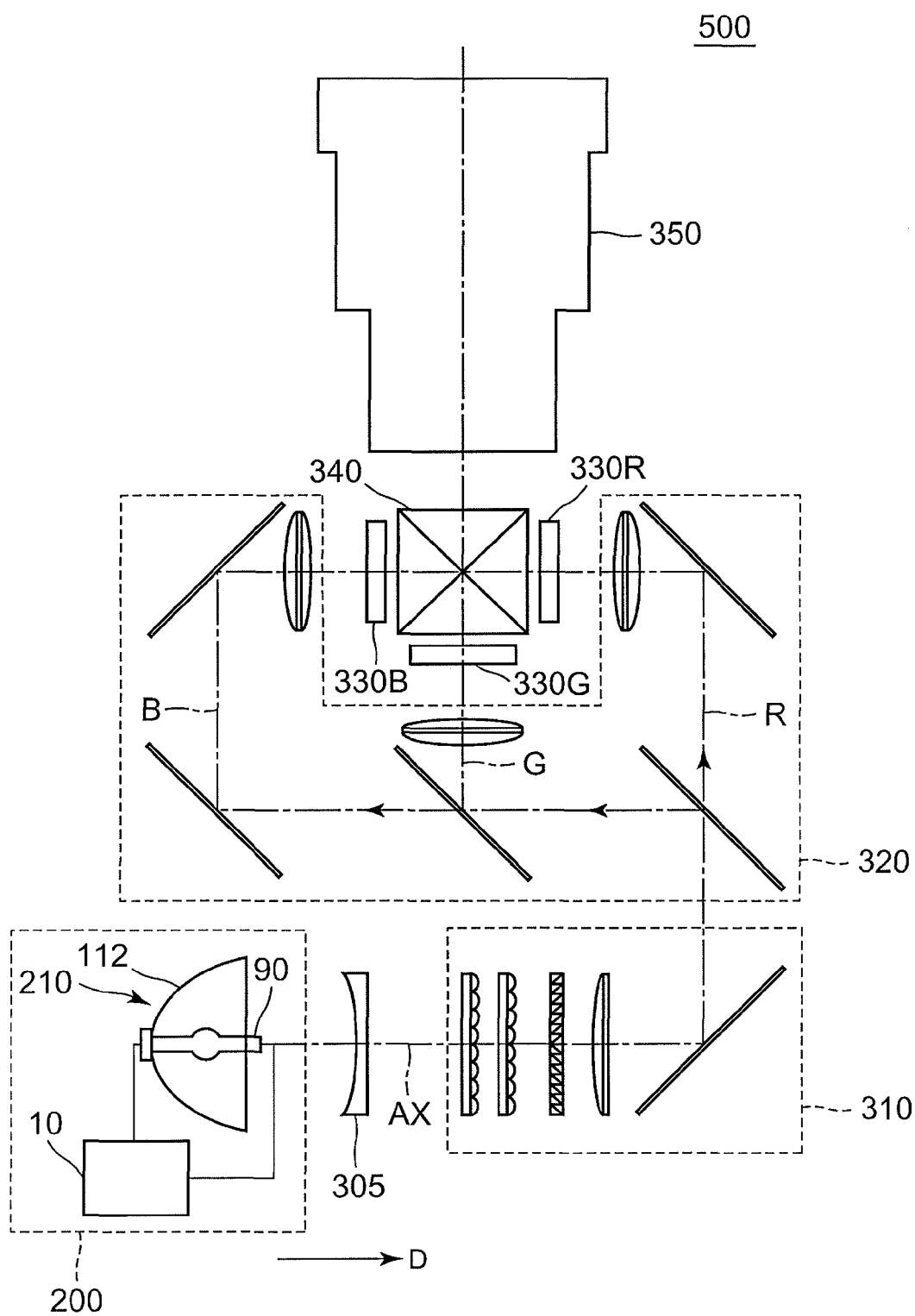
FIG. 1 is a diagram showing a configuration of an optical system of a projector according to an embodiment of the invention.

Hereinafter, an embodiment of the invention will be described with reference to the accompanying drawings.
1. Configuration of Optical System of Projector FIG. 1 is an explanatory diagram showing an optical system of a projector 500 according to the embodiment. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source 200 includes a light source unit 210 provided with a discharge lamp 90, and a discharge lamp lighting device 10 (a discharge lamp drive section) for supplying the discharge lamp 90 with electricity to thereby light the discharge lamp 90. Further, the light source unit 210 includes a main reflecting mirror 112 and a sub-reflecting mirror 50 (FIG. 2) for reflecting the radiated light from the discharge lamp 90, and reflects the light emitted from the discharge lamp 90 toward an irradiation direction D with the main reflecting mirror 112. The irradiation direction D is parallel to an optical axis AX. The light from the light source unit 210 passes through the collimating lens 305 and enters the illumination optical system 310. The collimating lens 305 collimates the light from the light source unit 210.

Figure 3:
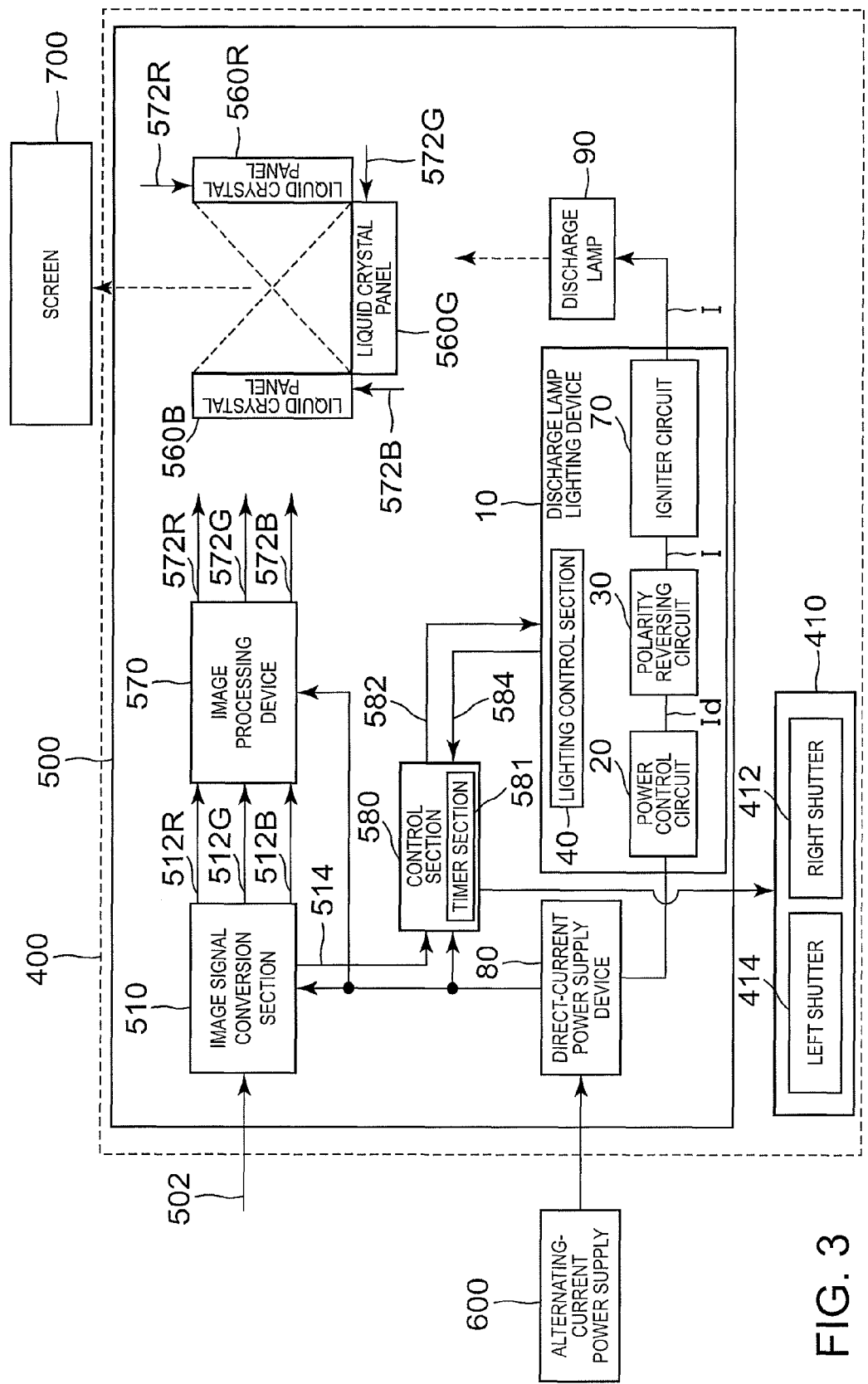
FIG. 3 is a block diagram showing a configuration of the projector according to the embodiment.

The illumination optical system 310 homogenizes the illuminance of the light from the light source device 200, and at the same time, uniforms the polarization direction of the light from the light source device 200 to a single direction. The light regulated by the illumination optical system 310 in the illuminance distribution and the polarization direction enters the color separation optical system 320. The color separation optical system 320 separates the incident light into three colored lights of red (R), green (G), and blue (B). The liquid crystal light valves 330R, 330G, and 330B associated with the respective colors modulate the three colored lights, respectively. The liquid crystal light valves 330R, 330G, and 330B are respectively provided with liquid crystal panels 560R, 560G, and 560B (FIG. 3), and polarization plates (not shown) disposed on both of the light entrance side and the light exit side of the respective liquid crystal panels 560R, 560G, and 560B. The cross dichroic prism 340 combines the three colored lights thus modulated. The composite light enters the projection optical system 350. The projection optical system 350 projects the incident light on a screen 700 (FIG. 3). Thus, an image is displayed on the screen 700. It should be noted that as a configuration of each of the collimating lens 305, the illumination optical system 310, the color separation optical system 320, the cross dichroic prism 340, and the projection optical system 350, various known configurations can be adopted.

Figure 2:
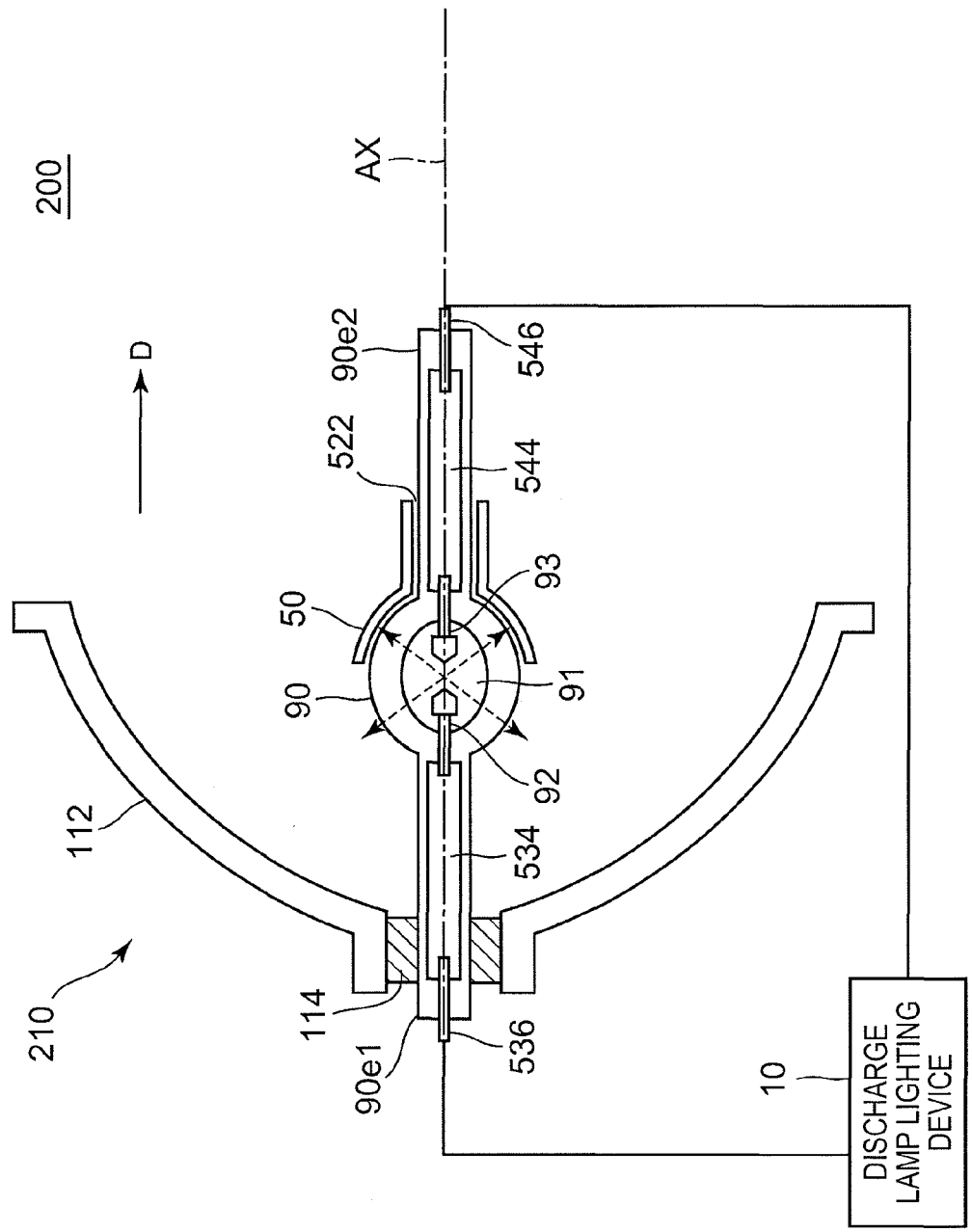
FIG. 2 is a diagram showing a configuration of a light source device.

FIG. 2 is a diagram showing a configuration of the light source device 200. FIG. 2 shows the discharge lamp lighting device 10 together with a cross-sectional view of the light source unit 210.

In the example shown in FIG. 2, the shape of the discharge lamp 90 is a rod-like shape extending from a first end 90e1 to a second end 90e2 along the irradiation direction D, and is formed with a light transmissive material such as quartz glass. A center portion of the discharge lamp 90 bulges to have a spherical shape, and a discharge space 91 is formed inside the center portion. Inside the discharge space 91, there is encapsulated a gas as a discharge medium including mercury, a noble gas, a metallic halide, and so on.

The discharge lamp 90 has a first electrode 92 and a second electrode 93 each made of metal such as tungsten. The first electrode 92 and the second electrode 93 are disposed so as to project inside the discharge space 91, wherein the first electrode 92 is disposed on the first end 90$e$1 side of the discharge space 91, and the second electrode 93 is disposed on the second end 90$e$2 side of the discharge space 91. Each of the first electrode 92 and the second electrode 93 has a rod-like shape extending along the optical axis AX. Inside the discharge space 91, electrode tip portions (also referred to as "discharge ends") of the first electrode 92 and the second electrode 93 are opposed to each other with a predetermined distance.

The first end 90$e$1 of the discharge lamp 90 is provided with a first terminal 536. The first terminal 536 and the first electrode 92 are electrically connected to each other with a conductive member 534 disposed through the inside of the discharge lamp 90. Similarly, the second end 90$e$2 of the discharge lamp 90 is provided with a second terminal 546. The second terminal 546 and the second electrode 93 are electrically connected to each other with a conductive member 544 disposed through the inside of the discharge lamp 90. The material of the first terminal 536 and the second terminal 546 is metal such as tungsten. For each of the conductive members 534, 544, molybdenum foil is used, for example.

The first terminal 536 and the second terminal 546 are connected to the discharge lamp lighting device 10. The discharge lamp lighting device 10 supplies the first terminal 536 and the second terminal 546 with the drive current for driving the discharge lamp 90. Due to this drive current, arc discharge occurs between the first electrode 92 and the second electrode 93, and the light (discharge light) generated by the arc discharge is radiated from the discharge position in all directions as indicated by the dotted arrow in the drawing.

To the first end 90$e$1 of the discharge lamp 90, there is fixed the main reflecting mirror 112 for reflecting the discharge light toward the irradiation direction D with a fixing member 114. A reflecting surface (a surface facing the discharge lamp 90) of the main reflecting mirror 112 has a spheroidal shape. It should be noted that as the shape of the reflecting surface of the main reflecting mirror 112, various shapes for reflecting the discharge light toward the irradiation direction D can be adopted besides the spheroidal shape, and a paraboloidal shape, for example, can also be adopted. In this case, the main reflecting mirror 112 can convert the discharge light into the light roughly parallel to the optical axis AX, and thus the collimator lens 305 can be eliminated.

On the second end 90$e$2 side of the discharge lamp 90, there is fixed the sub-reflecting mirror 50 with a fixing member 522. A reflecting surface (a surface facing the discharge lamp 90) of the sub-reflecting mirror 50 has a spherical shape surrounding the second end 90$e$2 side of the discharge space 91. The sub-reflecting mirror 50 reflects the discharge light toward the main reflecting mirror 112.

2. Configuration of Projector

FIG. 3 is a block diagram showing an example of a configuration of a projector according to the present embodiment. The projector 500 can also include an image signal conversion section 510, a direct-current power supply device 80, an image processing device 570, and a control section 580 in addition to the optical system shown in FIGS. 1 and 2. The projector 500 can also be configured as a projector system 400 in combination with an active-shutter glass type stereoscopic device 410.

The image signal conversion section 510 generates image signals 512R, 512G, and 512B based on an input image signal 502 input from the outside, and then supply the image processing device 570 with the image signals 512R, 512G, and 512B. The input image signal 502 can be an analog image signal or can be digital image data. In the case in which the input image signal 502 is the analog image signal, the image signal conversion section 510 can be provided with an A/D conversion function of converting the analog image signal into digital image data.

Further, in the case in which a stereoscopic image signal switched alternately between a first image and a second image at predetermined switching timings is input as the input image signal 502, the image signal conversion section 510 supplies the control section 580 with a sync signal 514 based on the switching timings between the first image and the second image. Here, in the case in which the stereoscopic signal of the side-by-side format or the top-and-bottom format is input as the input image signal 502, it is also possible for the image signal conversion section 510 to clip a frame of the first image and a frame of the second image out of each frame of the stereoscopic image signal and then perform resolution conversion thereon, and then sequentially output the image signal of the first image and the image signal of the second image.

The image processing device 570 performs image processing on each of the three image signals 512R, 512G, and 512B, and supplies the liquid crystal panels 560R, 560G, and 560B with drive signals 572R, 572G, and 572B for driving the liquid crystal panels 560R, 560G, and 560B, respectively. The liquid crystal panels 560R, 560G, and 560B modulate the colored lights separated into by the color separation optical system 320 as described above based on the drive signals 572R, 572G, and 572B, respectively.

The control section 580 is provided with a CPU, a ROM, a RAM, and so on not shown, and controls each section of the projector 500 to perform a series of operations from starting of lighting to extinction by the CPU executing a control program stored in the ROM. For example, the control section 580 outputs a communication signal 582 to the discharge lamp lighting device 10 to thereby control lighting and extinction of the discharge lamp 90. Further, the control section 580 receives a communication signal 584 from the discharge lamp lighting device 10 to thereby detect the lighting state of the discharge lamp 90 and the state of the drive current I supplied to the discharge lamp 90.

Further, the control section 580 switches the operation mode of the discharge lamp lighting device 10 and then makes the discharge lamp lighting device 10 perform the operation mode to thereby control the drive current I supplied to the discharge lamp 90.

Further, the control section 580 outputs a control signal 586 for controlling the stereoscopic device 410 in sync with the input image signal 502 to the stereoscopic device 410 via a wired or wireless communication device based on the sync signal 514.

The stereoscopic device 410 is provided with a right shutter 412 for blocking the eyesight on the right-eye side of the user and a left shutter 414 for blocking the eyesight on the left-eye side, and the open/close control of the right shutter 412 and the left shutter 414 is performed based on the control signal 586. By synchronizing the open/close timing of the right shutter 412 and the left shutter 414 with the switching timing of the frame projected by the projector 500, the user wearing the stereoscopic device 410 can view a three-dimensional image.

The direct-current power supply device 80 converts an alternating-current voltage supplied from an external alternating-current power supply 600 into a constant direct-current voltage, and then supplies the image signal conversion section 510, the image processing device 570, and the discharge lamp lighting device 10 with the direct-current voltage.

The discharge lamp lighting device 10 generates a high voltage between the first electrode 92 and the second electrode 93 of the discharge lamp 90 at the beginning of the projection by the projector 500 to thereby cause dielectric breakdown for forming the discharge path, and then supplies the drive current I for the discharge lamp 90 to maintain the discharge.

As shown in FIG. 3, the discharge lamp lighting device 10 is provided with a lighting control section 40, a power control circuit 20, a polarity reversing circuit 30, and an igniter circuit 70.

The power control circuit 20 generates the drive current to be supplied to the discharge lamp 90 based on the direct current input from the direct-current power supply device 80. The power control circuit 20 is formed of, for example, a down chopper circuit including a switch element (not shown) set to ON/OFF in accordance with a pulse input from the lighting control section 40, and generates and then outputs a direct current Id corresponding to the proportion of the ON period of the pulse.

The polarity reversing circuit 30 inputs the direct current Id output from the power control circuit 20, and reverses the polarity of the direct current Id at a predetermined timing to thereby generate and then output the drive current I, which is a direct current lasting for a controlled period of time or an alternating current having an arbitrary frequency. The polarity reversing circuit 30 is formed of, for example, an inverter-bridge circuit (a full-bridge circuit) including a plurality of switch elements (not shown). Each of the switch elements provided to the polarity reversing circuit 30 is set to ON/OFF in accordance with the control of the lighting control section 40. In accordance with the ON/OFF state of each of the switch elements, the polarity reversing circuit 30 outputs the direct current Id output by the power control circuit 20 with the polarity unreversed, or outputs the direct current Id with the polarity reversed. Therefore, the drive current I output by the polarity reversing circuit 30 can be set to the direct current or the alternating current with an arbitrary frequency due to the control by the lighting control section 40.

When lighting the discharge lamp 90, arc discharge is caused between the tip of the first electrode 92 and the tip of the second electrode 93. In the case of setting the drive current I to the direct current, either one of the first electrode 92 and the second electrode 93 is set to an anode, and the other is set to a cathode, and the electrons migrate from the cathode to the anode. Here, at the tip of the anode, the heat is generated by the collision of the electrons, and the temperature rises. Therefore, the temperature of the anode easily rise to a high level compared to the temperature of the cathode. If the state in which the temperature of one of the electrodes is higher than the temperature of the other of the electrodes lasts for a long period of time, there arises a concern that, for example, the tip of the high temperature electrode is excessively melted to cause unintended electrode deformation, and thus the arc length is shifted from an appropriate value, while in the cathode set to the lower temperature state, the tip is insufficiently melted with the minute unevenness caused at the tip left unmelted, which may cause a so-called arc jump.

Therefore, there is used the alternating-current drive of repeatedly switching the polarity of each of the electrodes in the discharge lamp 90. Specifically, by the polarity reversing circuit 30 periodically reversing the polarity of the drive current I to thereby set the drive current I to the alternating current, it is possible to alternate the anode and the cathode between the pair of electrodes provided to the discharge lamp 90 to thereby achieve resolution of the concern described above.

The lighting control section 40 controls the power control circuit 20 and the polarity reversing circuit 30 to thereby control the holding time during which the drive current I output to the discharge lamp 90 continues in the same polarity, the current value, the frequency, and so on of the drive current I. In detail, the lighting control section 40 controls the reversing state of the polarity in the polarity reversing circuit 30 to thereby perform the polarity reversion control for controlling the holding time during which the drive current I continues in the same polarity, and the frequency and so on of the drive current I. Further, the lighting control section 40 regulates the pulse output to the power control circuit 20 to thereby perform the current control for controlling the current value of the direct current Id generated by the power control circuit 20.

The lighting control section 40 can be formed of a hardware circuit partially or wholly, or it is also possible to realize the function of the lighting control section 40 by the CPU not shown executing a predetermined program. Further, it is also possible to provide the lighting control section 40 with a storage section (not shown), and to store the information related to drive parameters such as the holding time during which the drive current I continues in the same polarity, and the current value, frequency, the waveform, and the modulation pattern of the drive current I in the storage section. In this case, the lighting control section 40 can appropriately control the drive current I by controlling the power control circuit 20 and the polarity reversing circuit 30 based on the information stored in the storage section.

The igniter circuit 70 operates at the beginning of lighting of the discharge lamp 90, and supplies a high voltage (a voltage higher than the voltage applied in the normal lighting of the discharge lamp 90), which is necessary for causing the dielectric breakdown between the electrodes of the discharge lamp 90 to thereby form the discharge path at the beginning of lighting of the discharge lamp 90, between the electrodes of the discharge lamp 90. The igniter circuit 70 is connected, for example, in parallel to the discharge lamp 90.

Further, the it is also possible to provide the discharge lamp lighting device 10 with a configuration including a detection section having a voltage detection function of detecting the drive voltage of the discharge lamp 90 and then outputting the drive voltage information, a current detection function of detecting the current value of the drive current I and then outputting the drive current information, and so on.

Figure 4A:
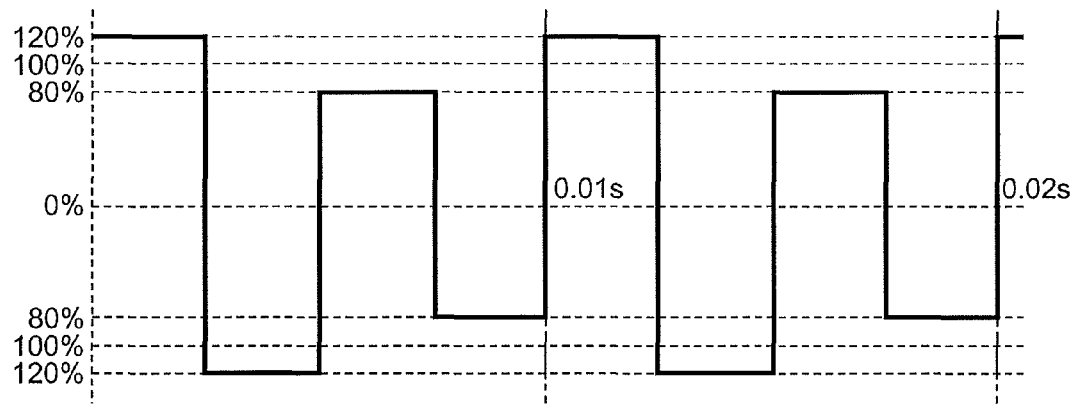
FIGS. 4A and 4B are diagrams showing an example of a drive current supplied to a discharge lamp.
Figure 4B:
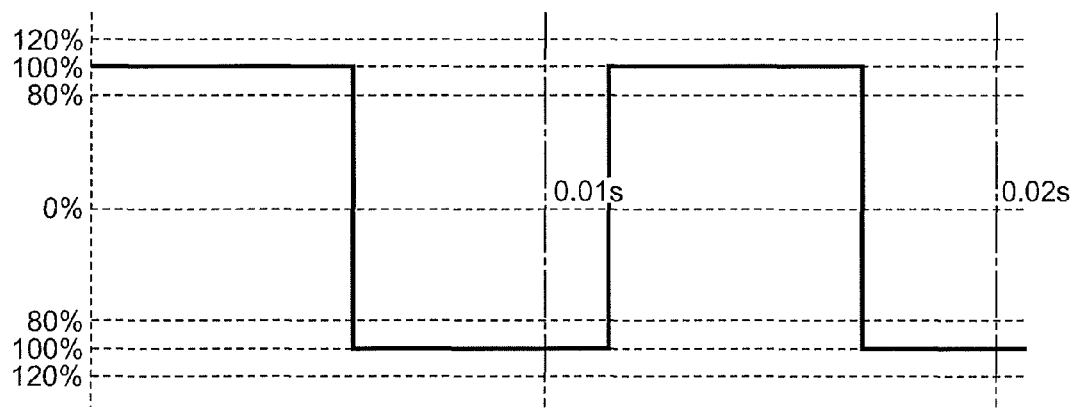

FIGS. 4A and 4B are diagrams showing an example of the drive current I supplied to the discharge lamp 90, wherein FIG. 4A shows the waveform of the drive current I in a first mode, and FIG. 4B shows the waveform of the drive current I in a second mode. The discharge lamp lighting device 10 operates in at least two operation modes, namely the first mode and the second mode due to the control by the lighting control section 40. The operation modes of the discharge lamp lighting device 10 denote the operation states different in the state of the drive current I output to the discharge lamp 90 from each other, and the operation modes are different in at least one or more of the frequency and the current value of the drive current I from each other.

The horizontal axis of each of FIGS. 4A and 4B represents time, and the vertical axis thereof represents the current value, wherein the center of the vertical axis corresponds to 0 volt, and the polarity is reversed between the upper half and the lower half of the vertical axis. Further, the current value in the vertical axis is expressed with the ratio assuming that the rated current value of the discharge lamp 90 corresponds to 100%.

It should be noted that the waveforms in FIGS. 4A and 4B do not correspond to the drive current I at the high voltage supplied at the beginning of lighting of the discharge lamp 90.

In the case in which the discharge lamp lighting device 10 operates in the first mode, the drive current I is set to the alternating current having the peak power of +120%, −120%, +80%, and −80% in one cycle, and the period of 0.01 second (the frequency of 100 Hz) as shown in FIG. 4A. In the first mode, since the power exceeding the rating is momentarily supplied to the discharge lamp 90, the luminance of the discharge lamp 90 temporarily increases. In other words, the intensity of the light projected by the projector 500 on the screen 700 increases. Further, since the first mode has a period in which the power of the drive current I is set to be lower than the rating in one cycle, the effective power is fitted within the appropriate range, which is appropriate as the use condition of the discharge lamp 90.

The first mode is suitable for the case of performing the projection requiring high light intensity in a short period of time, and is effective in the case in which, for example, a three-dimensional image signal is input as the input image signal 502, and the left-eye frame and the right-eye frame are alternately projected on the screen 700. In the case of projecting the three-dimensional image as described above, in order to avoid so-called crosstalk, the right shutter 412 and the left shutter 414 of the stereoscopic device 410 are closed in the transition between the left-eye frame and the right-eye frame. Since there is no influence on the user even in the case in which the intensity of the light projected on the screen 700 at these timings is decreased, no problem occurs even if the power of the drive current I is set to be lower than the rating.

The first mode can also be called a 3D boost mode since it is suitable for the projection of a three-dimensional image, or can also be called a high-intensity mode since the discharge lamp 90 is made to emit light at particularly high intensity.

In the case in which the discharge lamp lighting device 10 operates in the second mode, the drive current I is set to the alternating current having the peak power of +100% and −100% in one cycle, and the period of 0.01 second or longer (the frequency of 100 Hz or lower) as shown in FIG. 4B. In the second mode, the power of the drive current I does not exceed the rating. In the second mode, since the luminance of the projection light projected by the projector 500 on the screen 700 is kept constant, the projection light can be used all right no matter whether the image to be projected is a three-dimensional image or a two-dimensional image. The second mode can be called a normal lighting mode.

Between the first mode and the second mode described in this example, the instantaneous power and the frequency are different, but the effective power is the same. In other words, the discharge lamp lighting device 10 is capable of operating in the first mode and the second mode by varying the instantaneous power without varying the effective power.

Since in the first mode, the instantaneous power of the drive current I is high, if the first mode is continued for a long period of time, there is a possibility that a long-term influence is exerted on the shapes of the tips and the electrode gap of the first electrode 92 and the second electrode 93 to thereby affect the product life of the discharge lamp 90. In contrast, the second mode does not require to consider such an influence, and in addition, even if the deformation of the tips of the first electrode 92 and the second electrode 93 or the variation of the electrode gap between these electrodes occurs due to the operation in the first mode, there is an advantage of restoring the tips and the gap affected by the influence. This is because by lighting the discharge lamp 90 in the second mode, the tips of the first electrode 92 and the second electrode 93 are melted in a preferable condition so that the shapes of the tips are restored to preferable shapes, and the electrode gap is also restored to an appropriate size. As described above, the second mode restores the first electrode 92 and the second electrode 93, and can therefore be called an electrode regeneration mode.

Therefore, even if the deformation of the tips of the first electrode 92 and the second electrode 93 or the variation of the electrode gap occurs by operating in the first mode, by lighting the discharge lamp 90 in the second mode, it is possible to achieve the restoration of the first electrode 92 and the second electrode 93 to thereby inhibit the product life of the discharge lamp 90 from decreasing.

The control section 580 controls the discharge lamp lighting device 10 using the communication signal 582, and selects the operation mode of the discharge lamp lighting device 10 from the plurality of operation modes including the first mode and the second mode, and then makes the discharge lamp lighting device 10 operate in the operation mode thus selected. In other words, the discharge lamp lighting device 10 operates while switching the operation mode in accordance with the control by the control section 580. Thus, it is possible to vary the drive current I supplied to the discharge lamp 90 in accordance with the control by the control section 580.

The control section 580 is provided with a timer section 581. The timer section 581 is realized by the CPU executing a predetermined program, and performs timing based on the clock of the CPU. The timer section 581 counts the time during which the discharge lamp lighting device 10 supplies the drive current I for each of the operation modes of the discharge lamp lighting device 10. The time can also be called operation time of the discharge lamp lighting device 10, or lighting time of the discharge lamp 90. In the present embodiment, the timer section 581 separately counts the time during which the discharge lamp lighting device 10 operates in the first mode, and the time during which the discharge lamp lighting device 10 operates in the second mode. In the case in which the discharge lamp lighting device 10 is capable of operating in the operation modes other than the first and second operation modes, the timer section 581 can also count the operation time of the discharge lamp lighting device 10 for each of these operation modes.

The timer section 581 is configured so as not to reset the count value when powering ON or powering OFF the projector 500. For example, the CPU constituting the control section 580 stores the count value of the timer section 581 into a nonvolatile memory (not shown) when powering OFF the projector 500. Therefore, the count value of the timer section 581 corresponds to a cumulative count value from the beginning of use (an operation for an in-plant test can also be included) after manufacturing the projector 500. Further, it is also possible to adopt the configuration in which the count value of the timer section 581 can be reset by a predetermined operation when the repair of the projector 500 or the replacement of the discharge lamp 90 is performed.

3. Control of Drive Current

During the period of operating the discharge lamp lighting device 10 to supply the drive current I, the control section 580 looks up the count value of the timer section 581 for every predetermined time to select the operation mode of the discharge lamp lighting device 10 based on the count value or a parameter obtained from the count value, and then operates the discharge lamp lighting device 10 in the operation mode thus selected.

Specific operation examples will be cited as follows.

As a first operation example, the control section 580 calculates the sum of the count values for the respective operation modes in the timer section 581, and in the case in which the sum thus calculated reaches the time set in advance, the control section 580 restricts the operation in the first mode so as to coincide with the proportion of the operation time in the first mode set in correspondence with the time.

Figure 5:
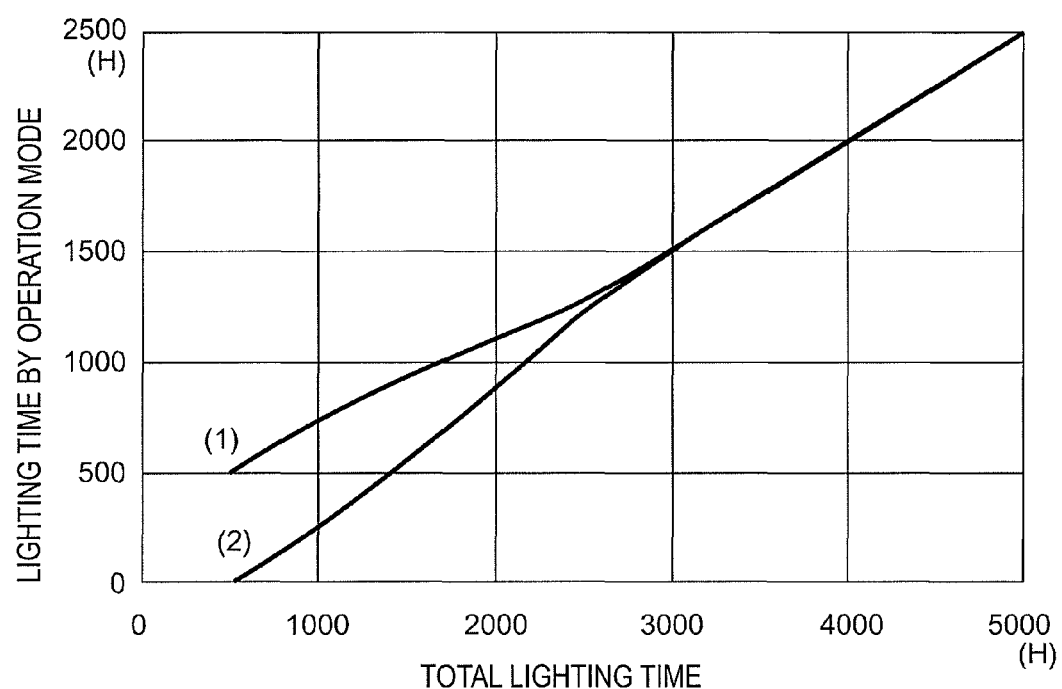
FIG. 5 is a chart showing an example of a relationship in the operation time between operation modes of a discharge lamp lighting device.

FIG. 5 is a chart of an example showing a relationship of the operation time between the first mode and the second mode in the first operation example. In the drawing, the horizontal axis represents the sum (total lighting time) of all of the operation modes, and the vertical axis represents the operation time in each of the operation modes, wherein the symbol (1) indicates the operation time in the first mode and the symbol (2) indicates the operation time in the second mode.

In the example shown in FIG. 5, the ratio between the operation time (1) in the first mode and the operation time (2) in the second mode is defined to be set to 1:1 after the sum of the operation time in all of the operation modes reaches 3000 hours.

Until the sum of the operation time in all of the operation modes reaches a predetermined time (e.g., 1000 hours), for example, the control section 580 makes the discharge lamp lighting device 10 operate in the first mode in the case of projecting a three-dimensional image, or makes the discharge lamp lighting device 10 operate in the second mode in the case of projecting a two-dimensional image.

Further, after the sum of the operation time reaches the predetermined time (e.g., 1000 hours), the control section 580 restricts the operation in the first mode so that the ratio of the operation time in the first mode to the operation time in the second mode is lower than a predetermined ratio (e.g., 1:1). In the example shown in FIG. 5, the ratio of the operation time (1) in the first mode is higher than 1:1 at the time point when the total lighting time reaches 1000 hours. Therefore, the control section 580 restricts the operation in the first mode after the total lighting time reaches 1000 hours to set the operation time in the first mode to be lower than the predetermined ratio (e.g., 1:1) to thereby decrease the ratio of the cumulative operation time (1) in the first mode so as to approximate the predetermined ratio (e.g., 1:1). More specifically, in the case of projecting a three-dimensional image, the control section 580 calculates the ratio (proportion) between the operation time in the first mode and the operation time in the second mode. If the ratio of the operation time in the first mode increases, the control section 580 selects the second mode as the operation mode of the discharge lamp lighting device 10, and if the ratio of the operation time in the first mode is maintained or the change in the ratio corresponds to decrease, the control section 580 changes the operation time in the first mode so that the ratio of the operation time in the first mode to the operation time in the second mode is lower than the predetermined ratio. In other words, in the case in which the ratio of the operation time in the first mode is equal to or higher than the predetermined ratio, the control section 580 selects the second mode as the operation mode of the discharge lamp lighting device 10, and in the case in which the ratio of the operation time in the first mode is lower than the predetermined ratio, the control section 580 selects the first mode as the operation mode of the discharge lamp lighting device 10.

Thus, as shown in FIG. 5, after the total lighting time reaches 3000 hours, the ratio between the operation time (1) in the first mode and the operation time (2) in the second mode is kept in 1:1, and thus, it is possible to perform the control preferable from the viewpoint of both of the improvement of the performance as the light source of the discharge lamp 90, and the assurance of the product life of the discharge lamp 90.

The ratio (the predetermined ratio) between the operation time in the first mode and the operation time in the second mode is not limited to 1:1, but can arbitrarily be determined. By setting the ratio within the range of, for example, 1:1 through 1:2, it is possible to more surely suppress the shortening of the product life of the discharge lamp 90, which is preferable. Further, the predetermined time described above used as the criterion of the sum of the operation time is not limited to 1000 hours shown as an example above, but can arbitrarily be determined. By setting the predetermined time within the range of, for example, 500 hours through 3000 hours, it is possible to more surely suppress the shortening of the product life of the discharge lamp 90, which is preferable.

In the first operation example, after the "sum of the operation time in all of the operation modes" obtained from the count value of the timer section 581 reaches the predetermined time, the control section 580 selects the operation mode of the discharge lamp lighting device 10 based on the parameter, namely the ratio between the operation time in the first mode and the operation time in the second mode.

As a second operation example, the control section 580 restricts the operation in the first mode every time the count value itself for the first mode in the timer section 581 reaches a value set in advance. For example, the frequency of selecting the first mode when projecting a three-dimensional image is set in advance in correspondence with the count value for the first mode, and the control section 580 selects the operation mode of the discharge lamp lighting device 10 in accordance with the frequency. For example, the control section 580 always selects the first mode when projecting a three-dimensional image in the case in which the operation time in the first mode is in a range of 0 through 1000 hours, sets the frequency of selecting the first mode in the case of projecting the three-dimensional image to ¾ in the case in which the operation time in the first mode is in a range of 1000 through 2000 hours, and sets the frequency of selecting the first mode in the case of projecting the three-dimensional image to ½ in the case in which the operation time in the first mode is equal to or longer than 2000 hours.

In the second operation example, the control section 580 selects the operation mode of the discharge lamp lighting device 10 based on the count value itself in the timer section 581.

Figure 6:
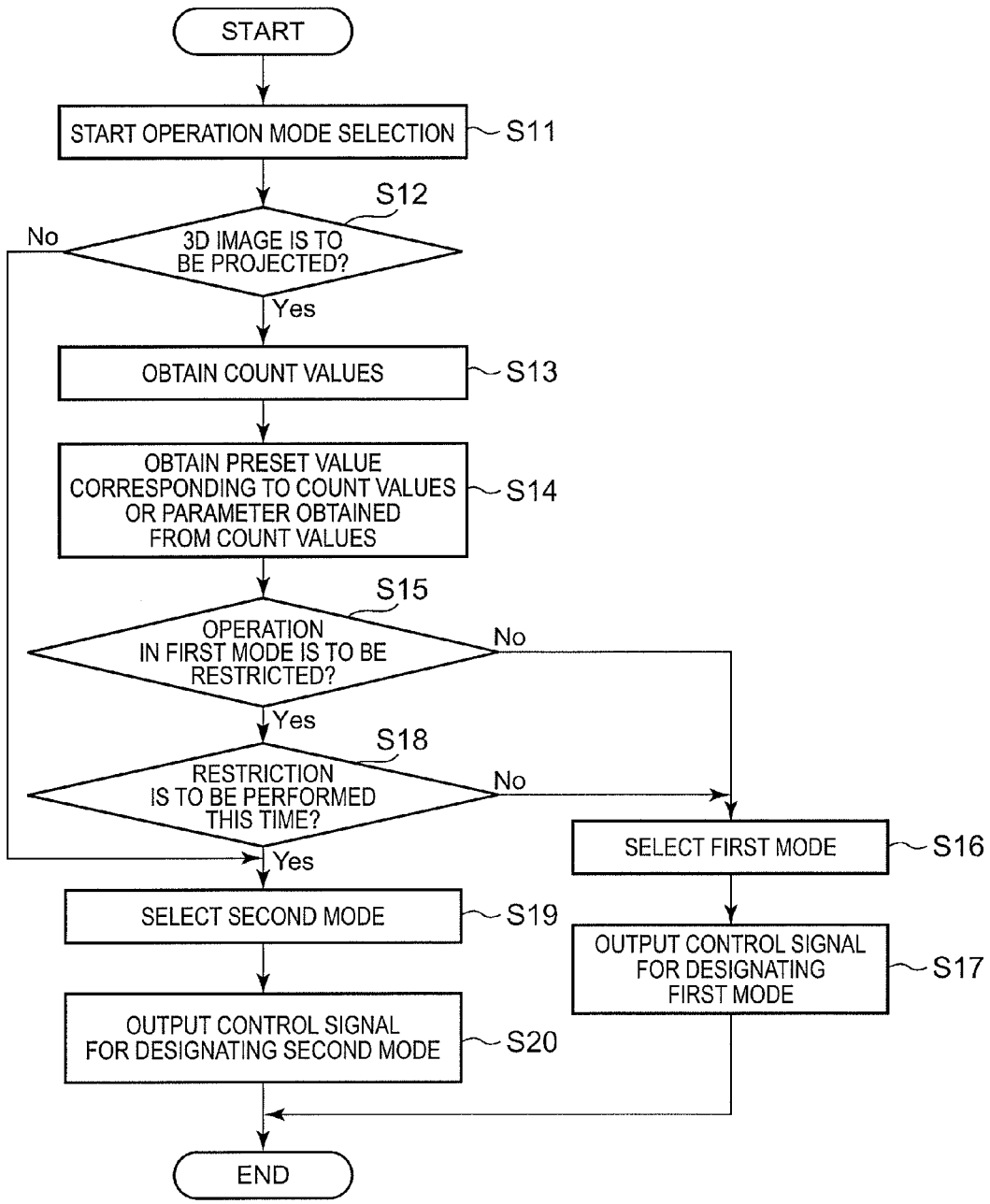
FIG. 6 is a flowchart showing an operation of the projector.

FIG. 6 is a flowchart showing the operation of the projector 500, and in particular showing the operation of the control section 580 selecting the operation mode of the discharge lamp lighting device 10 in the case of projecting a three-dimensional image.

The control section 580 starts (step S11) the operation of selecting the operation mode at the beginning of the operation of the discharge lamp lighting device 10, or every predetermined time after starting the operation. The control section 580 determines (step S12) whether or not the image to be projected by the projector 500 is a three-dimensional image, and if the three-dimensional image is projected (Yes in the step S12), the control section 580 obtains (step S13) the count values for the respective operation modes in the timer section 581. Here, the control section 580 obtains (step S14) a preset value set in advance in accordance with the count values for the respective operation modes thus obtained or the parameter (e.g., the sum of the count values) obtained from the count values. The preset value is stored in, for example, the ROM or the flash memory constituting the control section 580.

The control section 580 compares the preset value obtained in the step S14 and the count values obtained in the step S13 or the parameter obtained from the count values with each other to thereby determine (step S15) whether or not the operation in the first mode is restricted. In the first operation example described above, if the sum of the operation time of the respective operation modes of the discharge lamp lighting device 10, namely the sum of the lighting time of the discharge lamp 90, fails to reach 1000 hours, the operation in the first mode is not restricted. Further, even if, for example, the sum of the lighting time of the discharge lamp 90 reaches 1000 hours, in the case in which the ratio of the operation time in the first mode is lower than the predetermined ratio, the operation in the first mode is not restricted. In such a case (No in the step S15), the control section 580 selects (step S16) the first mode as the operation mode of the discharge lamp lighting device 10, then outputs (step S17) a control signal for designating the first mode as the communication signal 582, and then terminates the process of selecting the operation mode. The discharge lamp lighting device 10 supplies the discharge lamp 90 with the drive current I satisfying the frequency, the waveform, and the current value corresponding to the operation mode designated by the communication signal 582.

Further, in the case in which it is determined that the operation in the first mode is restricted (Yes in the step S15), the control section 580 determines (step S18) whether or not the operation in the first mode is restricted and the second mode is selected in the present process. In the operation example described above, the operation in the first mode is restricted so that the ratio of the operation time in the first mode is lower than the predetermined ratio. Specifically, since it is sufficient for the control section 580 to select the first mode and the second mode so as to coincide with the ratio thus set, the restriction does not necessarily mean that the operation in the first mode is not at all performed (the operation in the second mode is selected every time). Therefore, the control section 580 determines whether or not the second mode should be selected at the time point when executing the step S18.

If the operation in the first mode is not restricted (No in the step S18), the control section 580 makes a translation to the step S16 to select the first mode. Further, in the case in which the operation in the first mode is restricted in the present process (Yes in the step S18), the control section 580 selects (step S19) the second mode as the operation mode of the discharge lamp lighting device 10, then outputs (step S20) a control signal for designating the second mode as the communication signal 582, and then terminates the process of selecting the operation mode.

Further, if the projector 500 does not project the three-dimensional image (No in the step S12), the control section 580 makes a translation to the step S19 to select the second mode. It should be noted that in the case in which the projector 500 does not project the three-dimensional image, it is also possible to terminate the present process without outputting the communication signal 582 to the discharge lamp lighting device 10.

As explained hereinabove, the projector 500 according to the embodiment of the invention is provided with the discharge lamp 90, the discharge lamp lighting device 10 for supplying the discharge lamp 90 with the drive current I for driving the discharge lamp 90, the timer section 581 for counting the lighting time of the discharge lamp 90, and the control section 580 for controlling the discharge lamp lighting device 10 to select either one of the plurality of operation modes different in the drive current output to the discharge lamp 90 from each other, and operate in the operation mode thus selected, and the control section 580 selects the operation mode based on the lighting time counted by the timer section 581. Therefore, by appropriately adjusting, for example, the frequency and the period of time for operating in the high-intensity mode for increasing the light intensity of the discharge lamp 90, or appropriately combining the high-intensity mode with an electrode restoration mode for restoring the electrode gap of the discharge lamp 90 or the electrode shapes, it becomes possible to achieve both of the improvement of the performance as the light source and the improvement of durability at the same time.

The control section 580 can inhibit the product life of the discharge lamp 90 from being shortened by restricting the operation in some of the operation modes so that, for example, the ratio of the operation time in some of the operation modes affecting the product life of the discharge lamp is lower than a predetermined ratio set in advance. By using the ratio of the operation time between the operation modes as a parameter, and selecting the operation mode so that the parameter approximates the value set in advance as in the example described above, the operation state of the discharge lamp 90 can more appropriately be regulated.

Further, in the present control, since the operation in each of the operation modes is not restricted until the sum of the operation time in the operation modes reaches a predetermined time set in advance, it is also possible to perform the operation in the high-intensity mode for a long period of time in the state in which the influence on the product life of the discharge lamp 90 is small, the display can be performed giving high priority to the performance as the light source.

Further, since the discharge lamp lighting device 10 is capable of performing the operation in the high-intensity mode and the electrode restoration mode having the same effective power, and the frequency is lower in the electrode restoration mode, by performing the operations in the respective operation modes in combination with each other based on the lighting time of the discharge lamp 90, it is possible to appropriately select the state of lighting the discharge lamp 90 with the increased luminance and the state of restoring the electrode gap or the electrode shapes of the discharge lamp 90 to thereby achieve both of the improvement of the performance as the light source and the improvement of the durability at the same time.

The timer section 581 counts the lighting time of the discharge lamp 90 for each of the operation modes, it is possible to control the drive current I to be output to the discharge lamp 90 while reflecting the influence on the product life (the durability) of the discharge lamp 90 in more detail.

It should be noted that the embodiment described above is nothing more than an example of a specific aspect to which the invention is applied, and therefore, does not limit the invention. Therefore, it is also possible to apply the invention as an aspect different from the embodiment described above. For example, although in the embodiment described above, the explanation is presented citing the configuration in which the discharge lamp lighting device 10 performs the operation in the first mode and the operation in the second mode having the same effective power in accordance with the control by the control section 580 as an example, it is also possible to make the discharge lamp lighting device 10 capable of performing the operations in a plurality of operation modes different in effective power from each other, or to adopt a configuration capable of performing the operation in an operation mode for outputting the drive current I while varying the effective power as needed.

Further, for example, although in the embodiment described above the explanation is presented citing, as an example, the configuration of using the three transmissive or reflective liquid crystal light valves corresponding to the respective colors of RGB as the light modulation device, the invention is not limited to this configuration, but can be configured using a system including one liquid crystal light valve and a color wheel combined with each other, a system using three digital mirror devices (DMD) for modulating the colored lights of the respective colors of RGB, a system using one digital mirror device and a color wheel combined with each other, and so on. Here, in the case of using just one liquid crystal panel or DMD as a display section, the member corresponding to the combining optical system such as the cross dichroic prism is unnecessary. Further, besides the liquid crystal panel and the DMD, any configuration capable of modulating the light emitted from the light source can be adopted all right, and other detailed configurations of the projector can also be arbitrarily modified.

Further, the invention can be applied to a front projection projector for projecting the projection image on the screen from the side of observing the projection image, and also to a rear projection projector for performing the projection from the side opposite to the side of observing the projection image. Besides the above, the application object of the invention is not limited to the embodiment described above.

The entire disclosure of Japanese Patent Application No. 2012-207897, filed September 21 is expressly incorporated by reference herein.

What is claimed is:

1. A projector comprising:
   a discharge lamp;
   a discharge lamp drive section adapted to supply the discharge lamp with a drive current for driving the discharge lamp;
   a timer section adapted to determine a cumulative counted lighting time of the discharge lamp based on an operation of the discharge lamp; and
   a control section adapted to:
   control the discharge lamp drive section to select and then perform one of a plurality of operation modes having different current values of drive current to be output to the discharge lamp, the control section selecting the one of the plurality of operation modes based on the cumulative counted lighting time, wherein:
   the plurality of operation modes include a first mode and a second mode,
   the first mode and the second mode are each an operation mode of outputting an alternating current to the discharge lamp,
   effective power in the first mode and effective power in the second mode are equal to each other, and a frequency of the drive current in the second mode is lower than a frequency of the drive current in the first mode, such that the second mode regenerates: (i) a gap between the electrodes of the discharge lamp, or (ii) a shape of the electrodes of the discharge lamp, and
   the control section restricts operation of the projector in the first mode such that a ratio of a first operation time in the first mode to a second operation time in the second mode is less than a predetermined ratio in response to a sum of the first operation time and the second operation time being equal to or greater than a predetermined time.

2. The projector according to claim 1, wherein
   the timer section estimates the lighting time of the discharge lamp for each of the operation modes performed by the discharge lamp drive section.

3. The projector according to claim 2, wherein
   the control section selects the operation mode to be performed by the discharge lamp drive section based on a parameter calculated based on the lighting time in each of the operation modes that is estimated by the timer section.

4. The projector according to claim 1, wherein
   the plurality of operation modes include operation modes different in effective power from each other.

5. The projector according to claim 1, wherein
   the plurality of operation modes include an operation mode of varying the effective power.

6. The projector according to claim 1, wherein
   the plurality of operation modes include an operation mode of varying instantaneous power while keeping the effective power of the drive current to be output to the discharge lamp.

7. The projector according to claim 1, wherein
   the plurality of operation modes are each an operation mode performed in a period of a steady lighting of the discharge lamp.

8. The projector according to claim 1, wherein
   the first mode includes a period during which power supplied to the discharge lamp is higher than rating power of the discharge lamp and a period during which the power supplied to the discharge lamp is lower than the rating power, and
   the second mode is an operation mode in which the power supplied to the discharge lamp is not higher than the rating power.

9. A method for controlling a projector equipped with a discharge lamp, the method comprising:
   counting a cumulative lighting time of the discharge lamp based on an operation of the discharge lamp;
   selecting one of a plurality of operation modes based on the cumulative counted lighting time; and
   supplying the discharge lamp with a drive current corresponding to the selected operation mode, wherein:
   the plurality of operation modes include a first mode and a second mode each having different current values of drive current, the first mode and the second mode are each an operation mode of outputting an alternating current to the discharge lamp, effective power in the first mode and effective power in the second mode are equal to each other, and a frequency of the drive current in the second mode is lower than a frequency of the drive current in the first mode, such that the second mode regenerates: (i) a gap between the electrodes of the discharge lamp, or (ii) a shape of the electrodes of the discharge lamp, and operation of the projector in the first mode is restricted such that a ratio of a first operation time in the first mode to a second operation time in the second mode is less than a predetermined ratio in response to a sum of the first operation time and the second operation time being equal to or greater than a predetermined time.

10. A projector comprising:

a discharge lamp;

a power supply configured to supply a drive current to the discharge lamp;

a processor programmed to:

supply the discharge lamp with a drive current for driving the discharge lamp;

determine a cumulative counted lighting time of the discharge lamp based on an operation of the discharge lamp; and select and then perform one of a plurality of operation modes having different current values of drive current to be output to the discharge lamp, the one of the plurality of operation modes being selected based on the cumulative counted lighting time, wherein:

the plurality of operation modes include a first mode and a second mode, the first mode and the second mode are each an operation mode of outputting an alternating current to the discharge lamp, effective power in the first mode and effective power in the second mode are equal to each other, and a frequency of the drive current in the second mode is lower than a frequency of the drive current in the first mode, such that the second mode regenerates: (i) a gap between the electrodes of the discharge lamp, or (ii) a shape of the electrodes of the discharge lamp, and the processor restricts operation of the projector in the first mode such that a ratio of a first operation time in the first mode to a second operation time in the second mode is less than a predetermined ratio in response to a sum of the first operation time and the second operation time being equal to or greater than a predetermined time.

* * * * *